(12) United States Patent
Asada et al.

(10) Patent No.: US 6,827,177 B2
(45) Date of Patent: Dec. 7, 2004

(54) TORQUE DETECTOR AND ELECTRIC POWER STEERING CONTROLLER PROVIDED WITH TORQUE DETECTOR

(75) Inventors: Atsuhisa Asada, Obu (JP); Jiro Nakano, Okazaki (JP)

(73) Assignee: Toyoda Koki Kabushiki Kaisha, Kariya (JP)

(*) Notice: Subject to any disclaimer, the term of this patent is extended or adjusted under 35 U.S.C. 154(b) by 0 days.

(21) Appl. No.: 10/713,218

(22) Filed: Nov. 17, 2003

(65) Prior Publication Data

US 2004/0099471 A1 May 27, 2004

(30) Foreign Application Priority Data

Nov. 19, 2002 (JP) ...................................... 2002-334796

(51) Int. Cl.[7] .............................................. B62D 5/04
(52) U.S. Cl. .................. 180/446; 180/443; 73/862.325
(58) Field of Search ................................ 180/422, 443, 180/444, 446; 73/862.325, 862.326, 862.338, 862.339

(56) References Cited

U.S. PATENT DOCUMENTS

| | | | | |
|---|---|---|---|---|
| 4,834,201 A | * | 5/1989 | Miyazaki et al. | ........... 180/446 |
| 4,875,541 A | * | 10/1989 | Oshita et al. | ............... 180/446 |
| 5,182,711 A | * | 1/1993 | Takahashi et al. | ............ 701/41 |
| 5,616,849 A | * | 4/1997 | Mitsuzuka et al. | ..... 73/862.322 |
| 5,978,721 A | * | 11/1999 | Kagawa et al. | ............... 701/41 |
| 6,516,508 B1 | * | 2/2003 | Gandarillas | ................ 29/602.1 |

* cited by examiner

Primary Examiner—Avraham Lerner
(74) Attorney, Agent, or Firm—Oblon, Spivak, McClelland, Maier & Neustadt, P.C.

(57) ABSTRACT

A torque detector that suppresses fluctuation of an output value relative to fluctuation of an input value and that also has the output value accurately follow the input value even when the input value changes suddenly. The torque detector includes a detection element, a converter, and a hysteresis processor. The detection element detects the steering torque applied to a steering shaft when the steering shaft is rotated to generate an analog torque signal corresponding to the steering torque. The converter converts the analog torque signal to a digital torque signal. The hysteresis processor performs hysteresis processing on the digital torque signal to include the value of the digital torque signal in a predetermined range.

14 Claims, 7 Drawing Sheets

Comparison of Responsiveness

Fig.7

Assist Map

Fig.8

TORQUE DETECTOR AND ELECTRIC POWER STEERING CONTROLLER PROVIDED WITH TORQUE DETECTOR

CROSS-REFERENCE TO RELATED APPLICATIONS

This application is based upon and claims the benefit of priority from the prior Japanese Patent Application No. 2002-334796, filed on Nov. 19, 2002, the entire contents of which are incorporated herein by reference.

BACKGROUND OF THE INVENTION

The present invention relates to a torque detector used for adding an assisting force generated by a motor to an automobile steering system and to an electric power steering controller provided with a torque detector.

Heretofore, there have been various proposals of torque detectors for detecting the steering torque of a steering system and controlling the drive current of an electric motor in accordance with the steering torque so as to add an assisting force to the steering torque. There have also been various proposals of electric power steering apparatuses provided with torque detectors.

In conventional torque detectors and electric power steering apparatuses, the steering force applied by a driver is detected, and the detected steering force is subjected to A/D conversion and input to a microcomputer. The microcomputer carries out an arithmetic operation on the input value for performing assist control to calculate an output value. Then, the microcomputer applies an assisting force with a motor to the automobile steering system in accordance with the output value.

The A/D conversion results in truncation errors and computational errors. Thus, even though the actual input value is constant, the output value of the computation result may fluctuate and produce abnormal noise or adversely affecting steering sensation.

Figure 1:
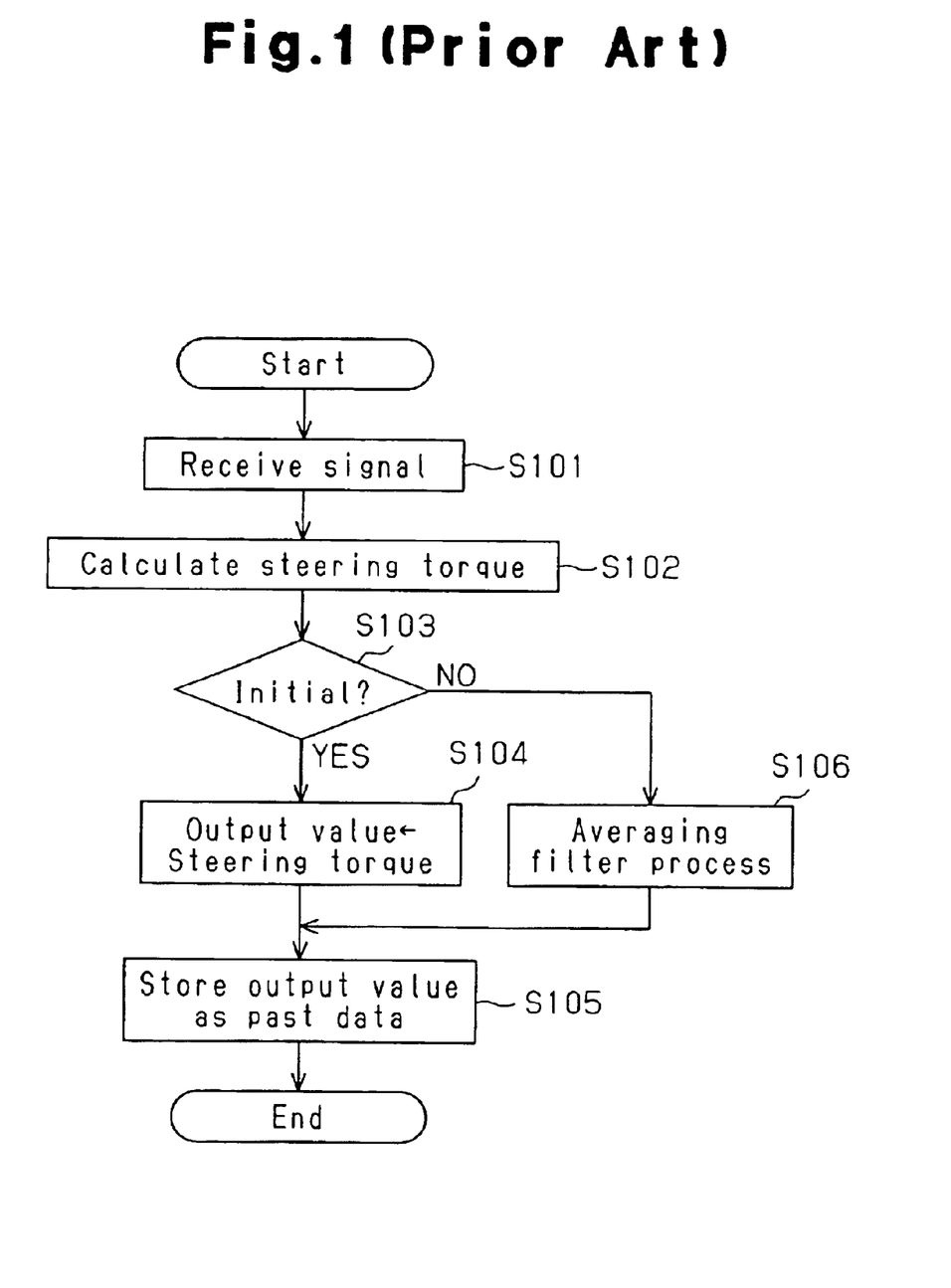
FIG. 1 is a flow chart of a control routine performed by an electric power steering apparatus in the prior art.

A conventional electric power steering apparatus that suppresses fluctuation of input value information generally has a microcomputer to perform an averaging filter process and average the input values, as shown in the flow chart of FIG. 1. In FIG. 1, the microcomputer first receives a signal corresponding to the steering torque in step S101 and calculates the steering torque in accordance with the received signal (step S102).

In step S103, the microcomputer determines whether or not the calculated steering torque is a value that has initially been obtained after starting the execution of a control program. When the steering torque is an initial value, the microcomputer proceeds to step S104 and sets the steering torque as the output value. When determining that the calculated steering torque is not an initial value, the microcomputer proceeds to step S106 to perform an averaging filter process on the steering torque. The value obtained through the averaging filter process is set as the output value.

In the averaging filter process, the present steering torque value is added to a plurality of steering torque values (data) obtained in the past. Then, the sum of steering torque values is averaged. In step S105, the present output value obtained in step S104 or step S106 is stored as a past output value in a memory device, such as a RAM. Then, the control program is temporarily ended.

In addition to the process of FIG. 1, a further filter process may be executed a number of times. A median filter process may also be executed. Therefore, in the prior art, fluctuation of the input values is suppressed in the data value. However, in the prior art, there is a shortcoming in that the response to sudden changes of the input value is not satisfactory.

SUMMARY OF THE INVENTION

One aspect of the present invention is a torque detector for detecting torque that is produced when a steering shaft of a vehicle is rotated. The torque detector includes a detection element for detecting steering torque that is applied to the steering shaft when the steering shaft is rotated to generate an analog torque signal corresponding to the steering torque. A converter is connected to the detection element to convert the analog torque signal to a digital torque signal. A hysteresis processor is connected to the converter to perform hysteresis processing on the digital torque signal so that a value of the digital torque signal is included in a predetermined range.

Another aspect of the present invention is a torque detector for detecting torque that is produced when a steering shaft of a vehicle is rotated. The torque detector includes a detection element for detecting steering torque that is applied to the steering shaft when the steering shaft is rotated to generate an analog torque signal corresponding to the steering torque. A converter is connected to the detection element to convert the analog torque signal to a digital torque signal. A calculation unit is connected to the converter to continuously receive the digital torque signal from the converter and perform a predetermined calculation process on the digital torque signal. The calculation unit includes an averaging processor connected to the converter to perform averaging processing on at least one value of the digital torque signal received in the past and the value of the currently received digital torque signal. A determiner determines the relationship between a predetermined threshold value and the value of the digital torque signal averaged by the averaging processor. A hysteresis processor performs hysteresis processing on the currently received digital torque signal to include the currently received digital torque signal in a predetermined range when the determiner determines that the value of the averaged digital torque signal is greater than the predetermined threshold value.

A further aspect of the present invention is an electric power steering controller for assisting operation of a vehicle steering device, the steering device including a steering shaft connected to a steering wheel. The electric power steering controller includes a torque detector for detecting torque that is produced when the steering shaft is rotated. The torque detector includes a detection element for detecting steering torque that is applied to the steering shaft when the steering shaft is rotated to generate an analog torque signal corresponding to the steering torque. A converter is connected to the detection element to convert the analog torque signal to a digital torque signal. A hysteresis processor is connected to the converter to perform hysteresis processing on the digital torque signal so that a value of the digital torque signal is included in a predetermined range. An electric motor is connected to the torque detector to generate motor torque that is added to the steering force of the steering shaft. A motor controller is connected to the torque detector and the electric motor for obtaining the motor torque corresponding to a digital torque signal subjected to the hysteresis processing and controlling the motor.

A further aspect of the present invention is an electric power steering controller for assisting operation of a vehicle steering device. The steering device includes a steering shaft connected to a steering wheel. The electric power steering controller includes a torque detector for detecting torque that is produced when the steering shaft is rotated. The torque detector includes a detection element for detecting steering torque that is applied to the steering shaft when the steering shaft is rotated to generate an analog torque signal corresponding to the steering torque. A converter is connected to the detection element to convert the analog torque signal to a digital torque signal. A calculation unit is connected to the converter to continuously receive the digital torque signal from the converter and perform a predetermined calculation process on the digital torque signal. The calculation unit includes an averaging processor connected to the converter to perform averaging processing on at least one value of the digital torque signal received in the past and the value of the currently received digital torque signal. A determiner determines the relationship between a predetermined threshold value and the value of the digital torque signal averaged by the averaging processor. A hysteresis processor performs hysteresis processing on the currently received digital torque signal to include the currently received digital torque signal in a predetermined range when the determiner determines that the value of the averaged digital torque signal is greater than the predetermined threshold value. An electric motor is connected to the torque detector to generate motor torque that is added to the steering force of the steering shaft. A motor controller is connected to the torque detector and the electric motor for obtaining the motor torque of the electric motor. The motor controller obtains the motor torque corresponding to the digital torque signal subjected to the hysteresis processing when the determiner determines that the averaged value of the digital torque signal is greater than the threshold value. The motor controller obtains the motor torque corresponding to the averaged value of the digital torque signal when the determiner determines that the average value of the digital torque signal is less than or equal to the threshold value.

A further aspect of the present invention is a torque detector for detecting torque that is produced when a shaft is rotated. The torque detector includes a detection element for detecting the torque that is applied to the shaft when the shaft is rotated to generate a torque signal corresponding to the torque. A calculation unit is connected to the detection element to perform hysteresis processing on the torque signal so that a value of the torque signal is included in a predetermined range.

A further aspect of the present invention is a method for detecting torque that is produced when a shaft is rotated. The method includes detecting the torque applied to the shaft when the shaft is rotated, generating a torque signal corresponding to the detected torque, and performing hysteresis processing on the torque signal to include the value of the torque signal in a predetermined range.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

Figure 2:
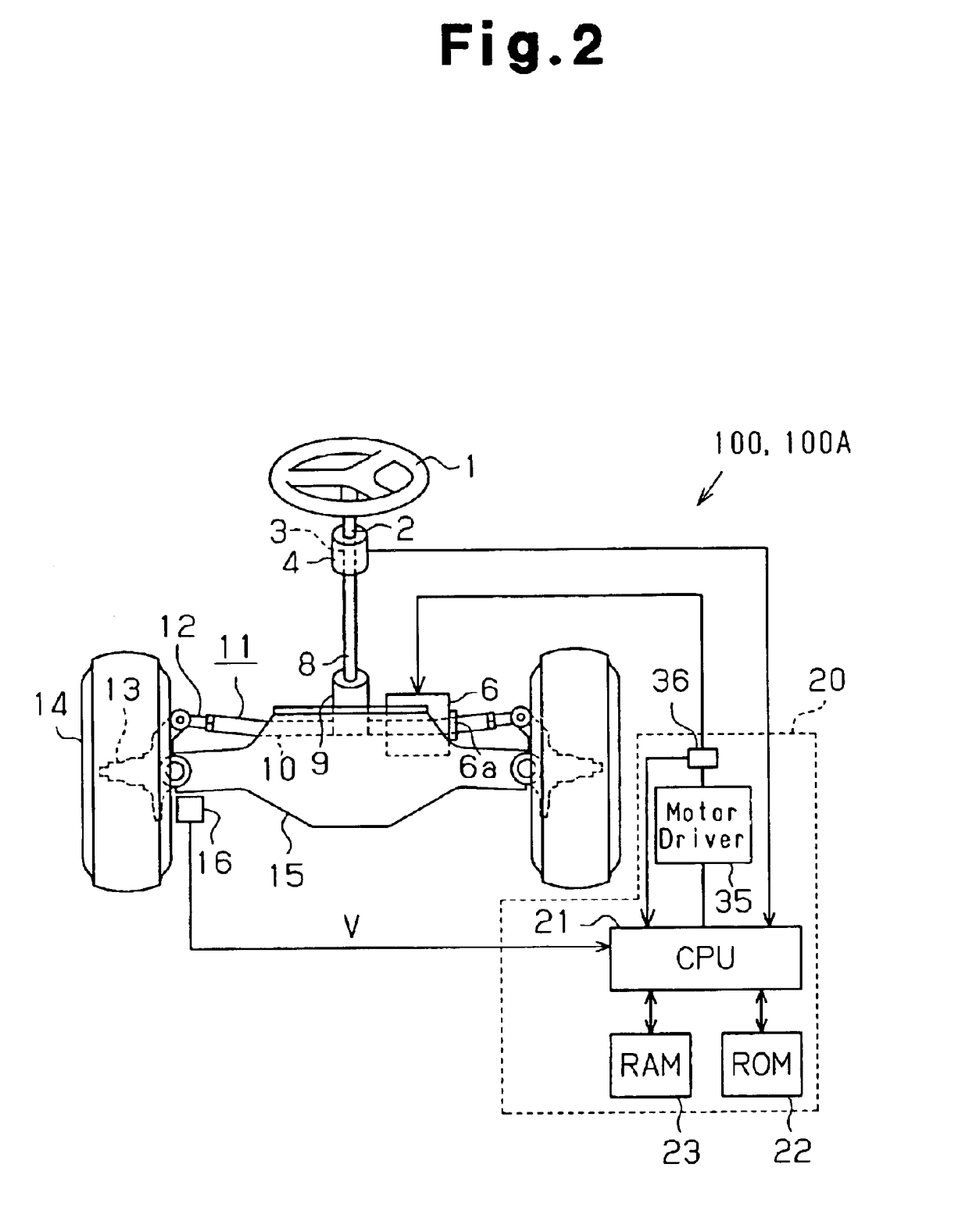
FIG. 2 is a schematic diagram of an electric power steering apparatus according to a first embodiment of the present invention.

FIG. 2 is a schematic diagram of an electric power steering apparatus according to a first embodiment of the present invention.

A torsion bar 3 is arranged on a steering shaft 2 connected to a steering wheel 1. A torque sensor 4 is provided on the torsion bar 3. When steering torque is applied to the steering wheel 1 so as to rotate the steering shaft 2, the torsion bar 3 is twisted in accordance with the added force. The torque sensor 4, which is a detection element, generates a signal (voltage) in accordance with the twisting, or the steering torque applied to the steering shaft 2, and outputs the generated voltage.

A pinion shaft 8 is fixed to the steering shaft 2. A pinion 9 is fixed to the distal end of the pinion shaft 8. The pinion 9 engages a rack 10. The rack 10 and the pinion 9 form a rack and pinion mechanism. A tie rod 12 is secured to each of the two ends of the rack 10. A knuckle 13 is pivotally connected to the end of the tie rod 12. A front wheel tire (hereinafter, front wheel) 14 is mounted on each knuckle 13. A cross member 15 is pivotally connected to one end of the knuckle 13.

An electric motor (hereinafter referred to as motor) 6 for assisting the steering torque is arranged coaxially with the rack 10. The motor 6 transmits motor torque (assisting force) in accordance with the steering torque to the rack 10 through a ball nut mechanism 6a. Accordingly, when the motor 6 rotates, the motor rotation is transmitted to the rack 10 by the ball nut mechanism 6a. The rack 10 changes the moving direction of the vehicle by altering the direction of the front wheels 14 mounted on the knuckles 13 by means of the tie rod 12.

A vehicle velocity sensor 16 is provided for the front wheels 14. The vehicle velocity sensor 16 detects the present vehicle velocity as a pulse signal having a cycle corresponding to the rotation speed of the front wheels 14 and outputs the pulse signal.

A control unit 20 is electrically connected to an electric power steering controller 100. The control unit 20 includes a central processor (CPU) 21, a read only memory (ROM) 22, a random access memory (RAM) 23 for temporarily storing data, and a motor driver 35.

The ROM 22 stores control programs for the calculation processes executed by the CPU 21 and a basic assist map. The RAM 23 temporarily stores the calculation results of the CPU 21.

The motor driver 35 is provided with a current sensor 36 for detecting a drive current (actual current) actually flowing to the motor 6. The current sensor 36 provides the CPU 21 with a current detection signal. In the first and second embodiments, the CPU 21 functions as a hysteresis processor and motor controller.

The electrical structure of the electric power steering controller 100 is described below.

Figure 3:
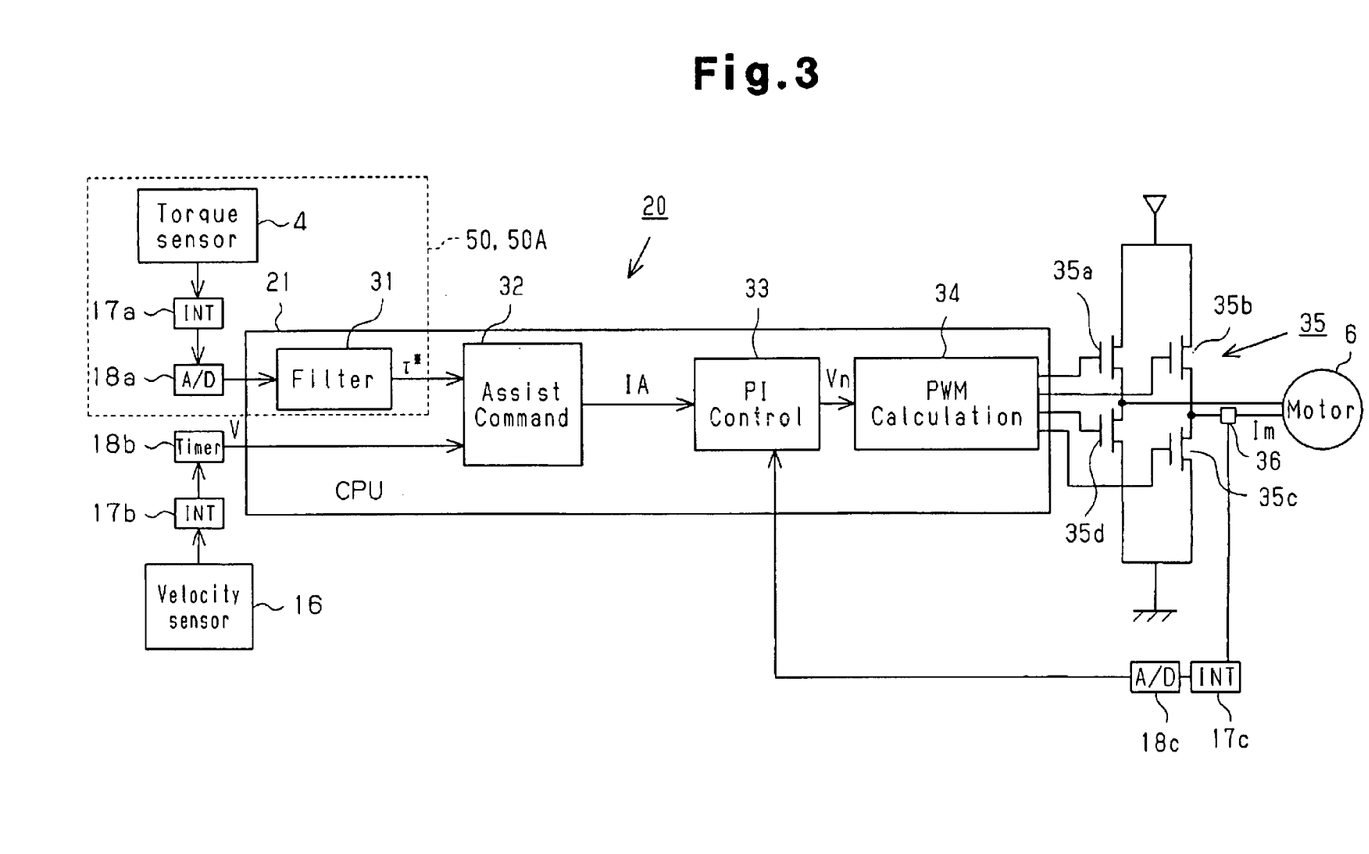
FIG. 3 is a block diagram of the electric power steering apparatus of FIG. 2.

FIG. 3 is a brief block diagram of the control unit 20. In FIG. 3, control blocks of the CPU 21 are shown within the frame of the CPU 21, and each control block represents a function executed by a program.

As shown in FIG. 3, the CPU 21 determines a pulse width modulation (PWM) command value to be sent to the motor driver 35 based on the steering torque and the vehicle velocity. The motor driver 35 generates a drive current corresponding to the PWM command value sent from the CPU 21 and supplies the drive current to the motor 6. The motor 6 generates a motor torque (steering assist torque) to add an assisting force to the steering force applied to the steering shaft 2 by the driver.

As shown in FIG. 3, the steering torque signal from the torque sensor 4 is provided to an A/D converter 18$a$ via an interface 17$a$. The A/D converter 18$a$ converts the analog steering torque signal to a digital signal and generates a steering torque $\tau$ as a digital signal. The steering torque $\tau$ is provided to the CPU 21.

The CPU 21 performs hysteresis processing in accordance with a hysteresis processing program stored in the ROM 22. Referring to FIG. 3, the CPU 21 has a filter section 31 that functions as a hysteresis processor. The filter section 31 obtains a steering torque $\tau^*$ through the hysteresis process and provides the hysteresis processed steering torque $\tau^*$ to an assist command section 32.

Figure 7:
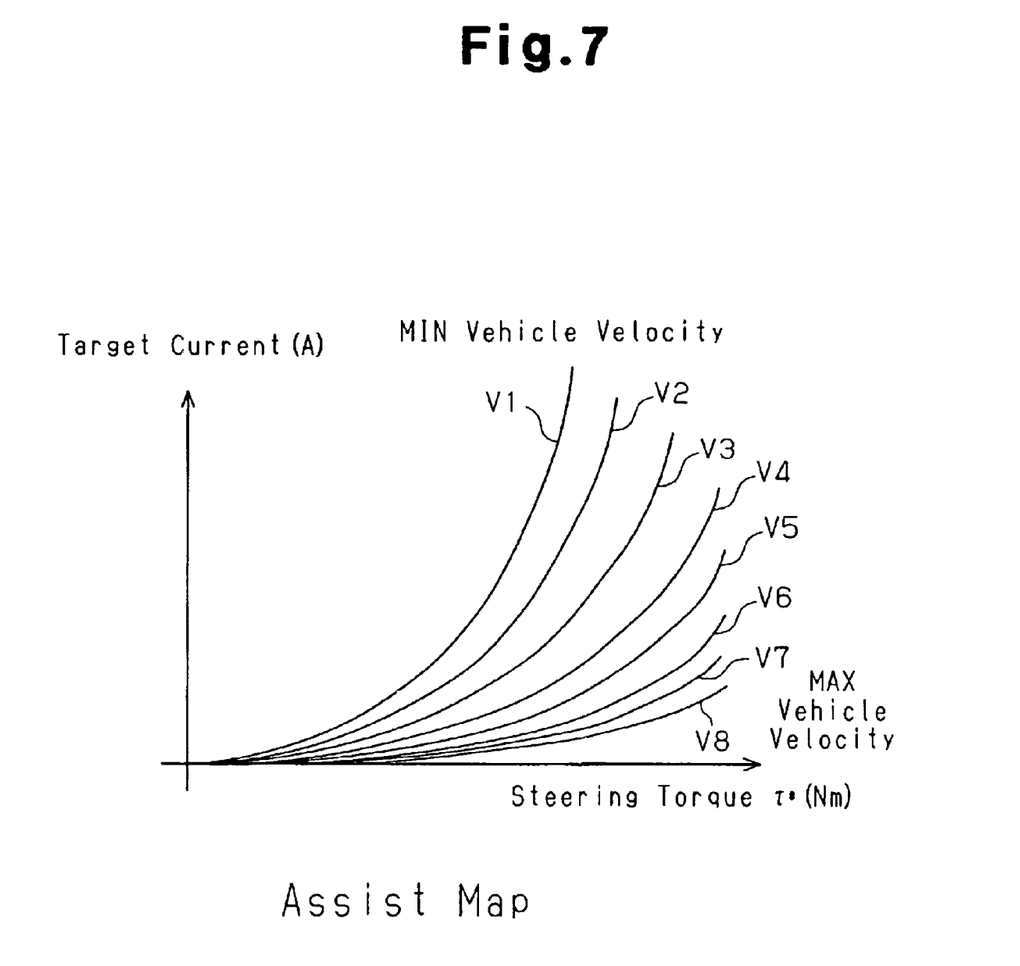
FIG. 7 is a memory map showing the data configuration in a memory of the electric power steering apparatus of FIG. 2.

The vehicle velocity signal of the vehicle velocity sensor 16 is provided to a timer 18$b$ through an interface 17$b$. The timer 18$b$ calculates the vehicle velocity V by counting the pulse cycles of the vehicle velocity signal. The CPU 21 has an assist command section 32 provided with the vehicle velocity V. The assist command section 32 determines a current command value IA based on the steering torque $\tau^*$ and the vehicle velocity V. The current command value IA is determined by referring to an assist map shown in FIG. 7. In FIG. 7, V1 through V8 each represent a vehicle velocity V.

The assist map will now be described. The assist map is used to determine the current command value IA, which is a target current of the motor 6 with respect to the steering torque $\tau^*$, and is stored in the ROM 22. The current command value (target current) IA corresponding to a vehicle velocity V and a steering torque $\tau^*$ is determined from the assist map.

As shown in FIG. 7, the current command value IA for a steering torque $\tau^*$ changes depending on the vehicle velocity V. The vehicle velocity V sequentially increases from vehicle velocity V1 to vehicle velocity V8. The current command value IA for a steering torque $\tau^*$ increases as the vehicle velocity V decreases. In the vehicle velocities V1 through V8, the rate of change in the current command value IA for a steering torque $\tau^*$ is greater when the steering torque $\tau^*$ is relatively large than when the steering torque $\tau^*$ is relatively small.

In the CPU 21, a PI control section 33 generates a voltage command value Vn corresponding to the current command value IA from the assist command section 32. A PWM calculation section 34 calculates a PWM command value, which is sent to the motor driver 35, in accordance with the voltage command value Vn.

The motor driver 35 includes FETs 35$a$ through 35$d$, which configure an H bridge. Each of the FETs 35$a$ through 35$d$ is a switching element, of which activation is controlled by the PWM signal. The FETs 35$a$ and 35$d$ on the left side of the H bridge, as viewed in FIG. 3, are activated and inactivated in a complementary manner. That is, when the upper FET 35$a$ is ON, the lower FET 35$d$ is OFF, and when the upper FET 35$a$ is OFF, the lower FET 35$d$ is ON. The FETs 35$b$ and 35$c$ on the right side are also activated and inactivated in a complementary manner. The FETs 35$a$ through 35$d$ are respectively activated by different duty ratios Da, Db, Dc (1-Db), and Dd (1-Da) to control the motor 6.

The CPU 21 performs feedback control in accordance with the motor current detected by the current sensor 36. A detection signal corresponding to the motor current from the current sensor 36 is provided to an A/D converter 18$c$ through an interface 17$c$, subjected to digital conversion by the A/D converter 18$c$, and sent to the PI control section 33. In the feedback control, for example, when the steering torque of the driver is in a constant state and the motor current decreases for some reason, the CPU 21 increases the motor drive voltage to prevent a drop in the steering torque transmitted to the rack 10.

In the first embodiment, a torque detector 50 includes the torque sensor 4, the A/D converter 18$a$, and the CPU 21, which functions as a hysteresis processor. The electric power steering controller 100 includes the torque detector 50 and the CPU 21, which is a motor controller for controlling the motor 6 and which obtains the motor torque corresponding to a steering torque.

[Processing Performed by the Filter Section 31]

The hysteresis process program executed by the CPU 21 will now be described with reference to the flow chart of FIG. 4. The hysteresis process program is executed periodically at fixed intervals.

Figure 4:
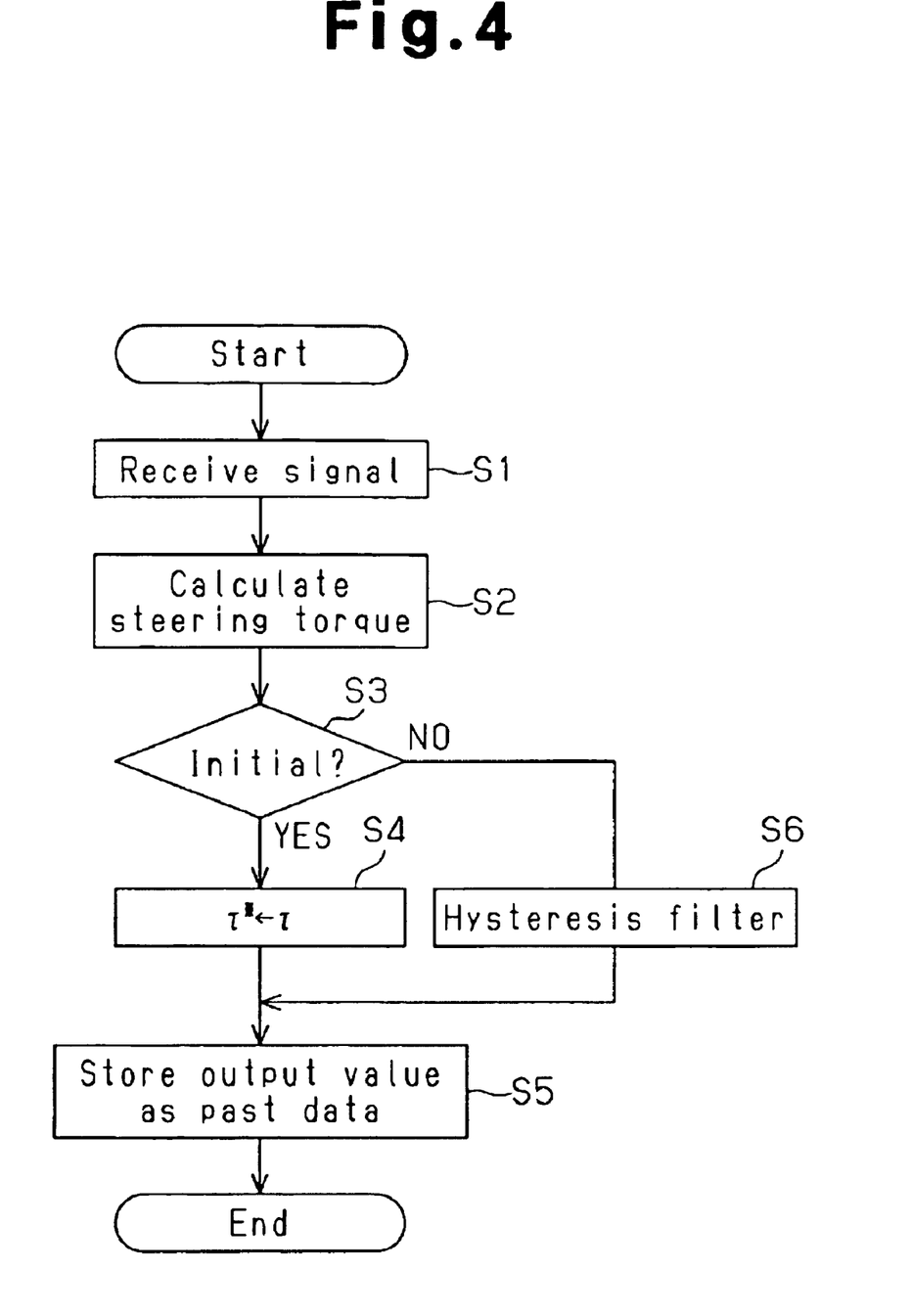
FIG. 4 is a flow chart of a control routine performed by the electric power steering apparatus of FIG. 2.

In step S1 of FIG. 4, the CPU 21 reads the steering torque signal of the A/D converter 18$a$ from a predetermined region of the RAM 23. In step S2, the CPU 21 performs a calculation based on the steering torque signal read in step S1 to obtain the steering torque $\tau$.

In step S3, the CPU 21 determines whether or not the steering torque $\tau$ obtained through the hysteresis process program is an initial value that is obtained after an ignition switch (not shown) is turned ON. When the value is an initial value, the CPU 21 proceeds to step S4, and the CPU 21 sets the steering torque $\tau$ as the steering torque $\tau^*$. When the value is not an initial value, the CPU 21 proceeds to step S6 and executes the hysteresis process.

Then, in step S5, the CPU 21 stores the steering torque $\tau^*$ set during the current control cycle in step S4 or S6 as past data in a memory device, such as the RAM 23, and temporarily ends the control program.

The hysteresis process will now be described. In the hysteresis process, the steering torque x, which is calculated based on the steering torque signal obtained from the A/D converter 18$a$, is used as an input value I.

More specifically, a change amount $\Delta$ is first calculated with the equation below.

change amount $\Delta$=current input value $I$−previous output value $O(n)$

Then, a determination is made as to whether or not the change amount $\Delta$ is less than or equal to a hysteresis range H.

fluctuation $D$ (change amount $\Delta$−hysteresis range $H$)$\leq 0$  (2)

In making this determination, the hysteresis range H is a positive value when the change amount Δ is positive, and the hysteresis range H is a negative value when the change amount Δ is negative. However, the absolute values are the same numerical values. When the change amount Δ is less than or equal to the hysteresis range H (i.e., when the fluctuation D is less than or equal to 0), a value identical to the previous output value is output as the current output value. In other words, the following equation is satisfied.

$$\text{current output value } Ok = \text{previous output value } Om \quad (3)$$

When the change amount Δ is greater than the hysteresis range H (i.e., when the fluctuation D is greater than 0), the fluctuation D is added to the previous output value Om, and output as the current output value Ok.

$$\text{Current output value } Ok = \text{previous output value} + \text{fluctuation } D \quad (4)$$

At this time, the hysteresis range H is a positive value when the change amount Δ is positive, and the hysteresis range H is a negative value when the change amount α is negative. However, the absolute values are the same numerical values.

When equations (1) and (2) are substituted in equation (4) the following equation is satisfied.

$$\begin{aligned} Ok &= Om + D \\ &= Om + (\Delta - H) \\ &= Om + ((I - Om) - H) \\ &= I - H \end{aligned}$$

The current output value Ok is a value obtained by subtracting the hysteresis range H from the current input value I. In this case, the hysteresis range H is a positive value when the change amount Δ is positive, and the hysteresis range H is a negative value when the change amount Δ is negative. The absolute values of positive and negative hysteresis ranges H are equal. In this way, the current output value Ok is included in the hysteresis range H of the current input value I.

Specifically, in the hysteresis filter process of step S6, the calculation of equations (5) and (6) are performed sequentially.

$$W = \text{MIN } \{Om, I+H\} \quad (5)$$

$$Ok = \text{MAX } \{W, I-H\} \quad (6)$$

First, in equation (5), the value obtained by adding the hysteresis range H to the current input value I is compared to the previous output value Om, and the smaller one of the values Om and I+H is calculated as the calculation value W. Then, in equation (6), the value obtained by subtracting the hysteresis range H from the current input value I is compared to the calculation value W obtained by equation (5), and the larger one of the values W and I−H is calculated as the current output value Ok.

By means of the calculations using the equations (5) and (6), the steering torque τ obtained based on the steering torque signal from the A/D converter 18a is included in the hysteresis range H and output from the filter section 31 as the steering torque τ*.

Figure 5:
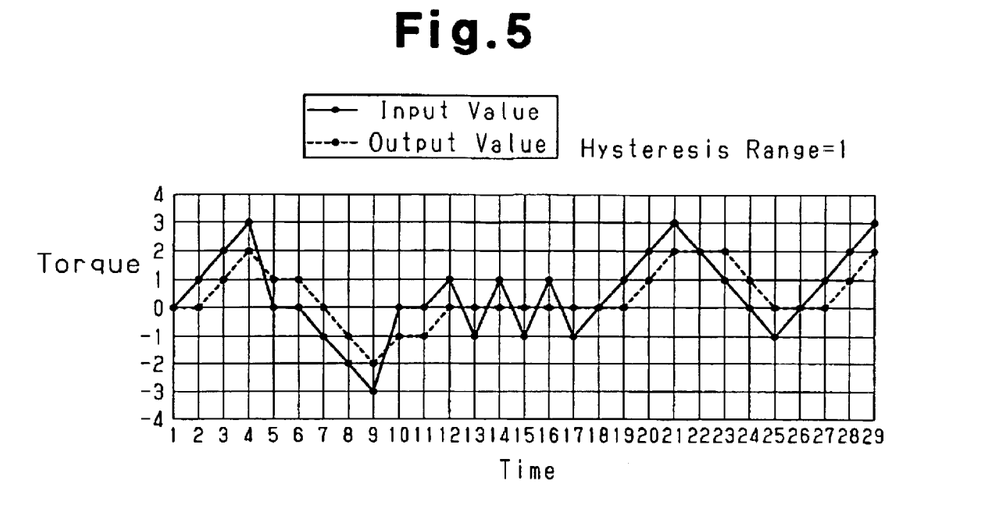
FIG. 5 is a graph illustrating a hysteresis filter process performed in the first embodiment.

FIG. 5 shows an example of the execution of the hysteresis process in step S6. The vertical axis in FIG. 5 represents the torque, and the horizontal axis represents time. In the example of FIG. 5, the range of the torque is limited to −4 to +4, the torque input values and output values are integers, and the hysteresis range H is 1 in order to simplify the explanation. The numbers 1 through 29 on the horizontal axis represent the number of executions n of the processing program.

In FIG. 5, at n=1, the input value of 0 is provided to the filter section 31. Since input data of torque 0 is the initial data, an output value of torque 0 is output from the filter section 31. At n=2, the input value of torque 1 is provided to the filter section 31. The input value of torque 1 is subjected to hysteresis processing in step S6 of FIG. 4.

At this time, the calculation results from equations (5) and (6) are as follows.

$$W = \text{MIN } \{0, 2\} = 0$$

$$Ok = \text{MAX } \{0, 0\} = 0$$

Therefore, the filter section 31 generates an output value Ok of torque 0.

Then, at n=3, an input value of torque 2 is provided to the filter section 31 and subjected to hysteresis processing.

At this time, the calculation results from equations (5) and (6) are as follows.

$$W = \text{MIN } \{0, 2\} = 0$$

$$Ok = \text{MAX } \{0, 1\} = 1$$

Therefore, the filter section 31 generates an output value Ok of torque 1.

In this manner, the filter section 31 sequentially generates output values Ok (steering torques τ*) corresponding to the input values I (steering torque τ). As a result, the output value Ok behaves relative to the input value I in the manner shown in FIG. 5.

Figure 6:
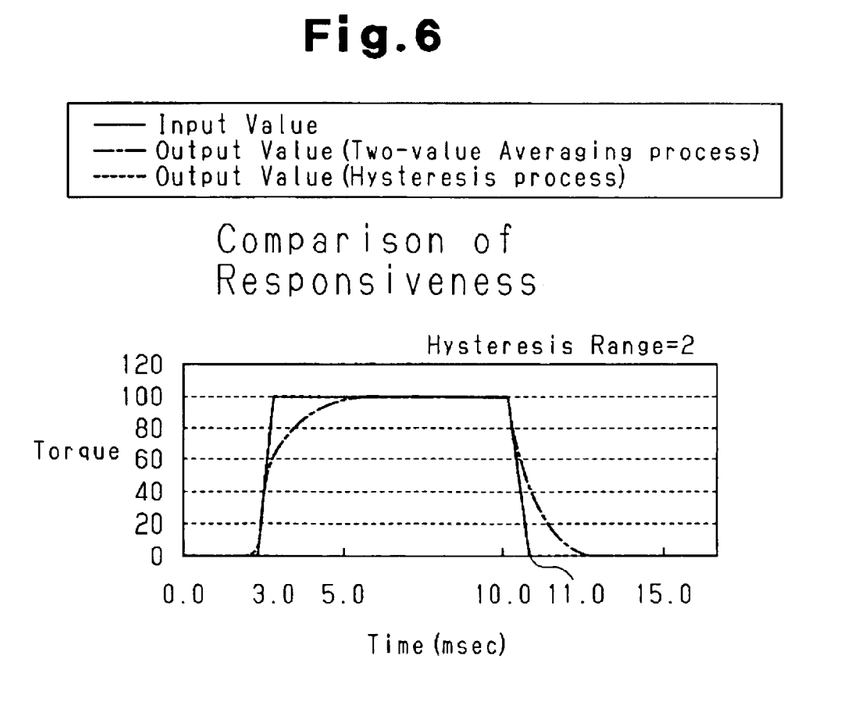
FIG. 6 is a graph illustrating the responsiveness of the hysteresis filter process in the first embodiment.

FIG. 6 shows the responsiveness of the output value relative to the input value. The vertical axis in FIG. 6 represents torque, and the horizontal axis represents time. FIG. 6 shows the output value relative to the input value when hysteresis processing has been performed and when two-value averaging process has been performed. When the two-value averaging process is performed, the current input value and the previous output value are averaged.

In the example of FIG. 6, the input value increases from torque 0 to torque 100 at time 3.0. The torque 100 is maintained and decreased to torque 0 from time 11.0. The responsiveness of the output value to the change in the input value is different for the output value derived by performing the hysteresis process and the output value derived by performing the two-value averaging process.

The output value derived from the hysteresis process is obtained within the hysteresis range H of the input value. Thus, the output value changes linearly and nearly identically with the input value. Further, the output value closely follows the input value. For example, when the input value of torque 100 is supplied to the filter section 31 at time 3.0, an output value of torque 98 is generated according to equations (5) and (6). When the input value changes to 0 at time 11.0, the output value changes to 2.

In contrast, the output value derived by performing the two-value averaging process is averaged using past output values. Thus, the output value does not follow the input value as closely as when performing the hysteresis process. At time 3.0, the output value is 50 relative to the input value of torque 100. By sequentially averaging the input values, the output value gradually approaches the input value of 100. Then, when the input value changes to 0 at time 11.0, the output value changes to 50. By sequentially averaging the input values, the output value gradually approaches 0 of the input value.

When there are minute changes in the input value, the change in the output value is suppressed by the hysteresis process, as shown in FIG. 5. Furthermore, when the input value increases or decreases suddenly, the responsiveness of the output value is prevented from being decreased, as shown in FIG. 6.

The torque detector 50 and the power steering controller 100 of the first embodiment have the advantages described below.

(1) The CPU 21 executes the hysteresis process for the steering torque τ, which is a datum corresponding to the steering torque applied to the steering shaft 2, and obtains the steering torque τ* within a predetermined hysteresis range H. Accordingly, the steering torque τ* (output value) that is generated suppresses the range of fluctuation of the steering torque τ (input value). Further, the output value follows the input value with improved accuracy when the input value changes suddenly.

(2) The electric power steering controller 100 includes the torque detector 50 and the CPU 21, which functions as a motor controller for controlling the motor 6 and determining the motor torque in accordance with the steering torque. Accordingly, the electric power steering controller 100 has the benefits of advantage (1).

Figure 8:
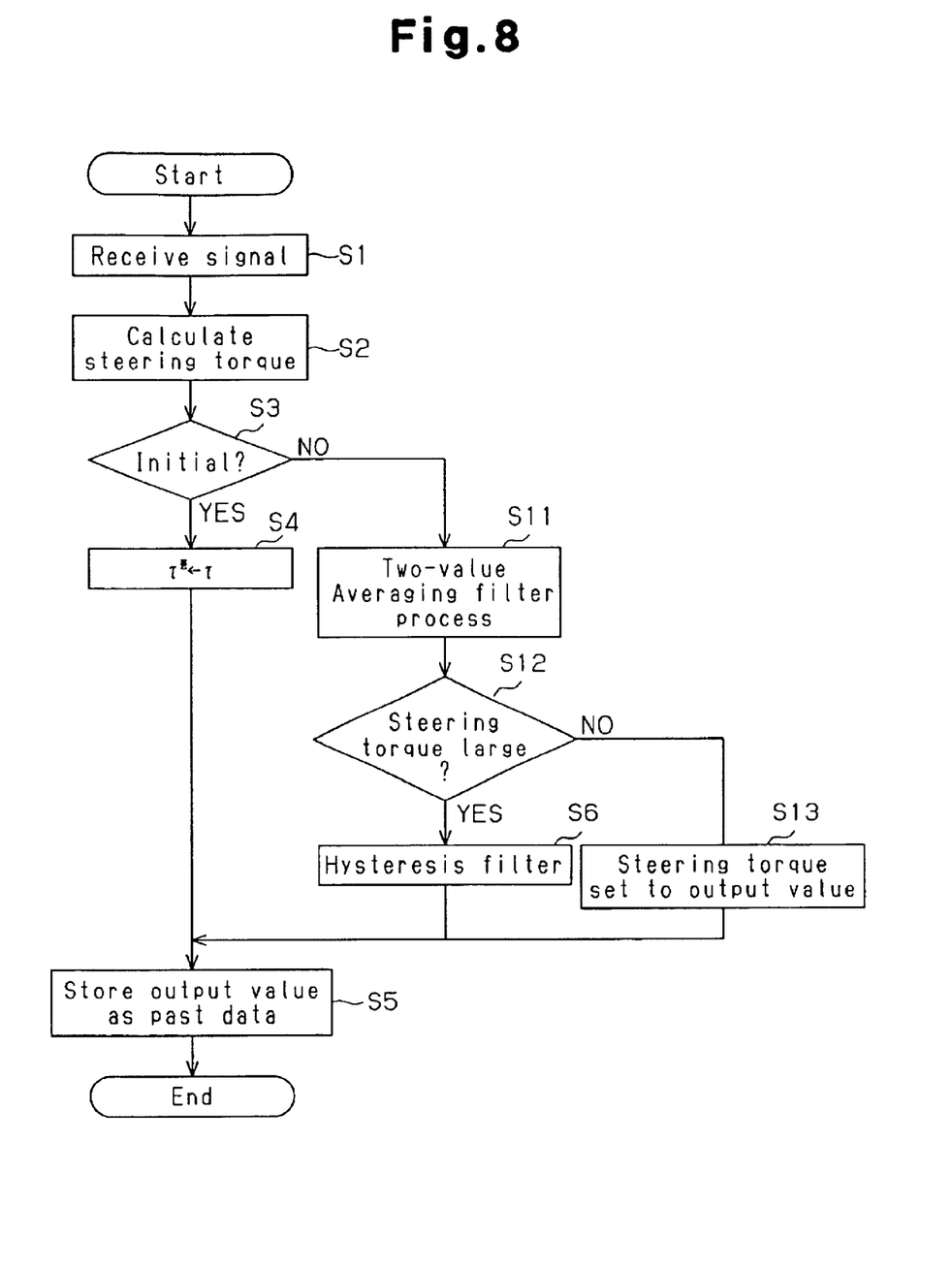
FIG. 8 is a flow chart of a control routine performed by the electric power steering apparatus according to a second embodiment of the present invention.

FIG. 8 is a flow chart used to control an electric power steering controller 100A according to a second embodiment of the present invention. The second embodiment differs from the first embodiment in the calculation performed by the filter section 31. In the case of the second embodiment, the filter section 31 of FIG. 3 functions as an averaging processor for performing an averaging process, a determiner for performing a determination process, and a hysteresis processor for performing a hysteresis process.

In the second embodiment, the torque detector 50A includes a torque sensor 4 as a detection element, A/D converter 18a as a converter, and CPU 21 as an averaging process device, determiner, and hysteresis process device. The electric power steering controller 100A includes the torque detector 50A, and the CPU 21 as a motor control device for determining a motor torque corresponding to the steering torque and controlling the motor 6.

In addition to steps S1 through S6 of FIG. 4, the CPU 21 executes steps S11 through S13 as shown in FIG. 8. In step S11, the CPU 21 executes an two-value averaging filter process to average the currently obtained steering torque τ and the previously obtained steering torque. In step S12, the CPU 21 determines the relationship of the averaged steering torque and a previously set threshold value L.

When the averaged steering torque is determined to be greater than or equal to the threshold value L in step S12, the CPU 21 proceeds to step S6. In step S6, the CPU 21 subjects the input value, or the steering torque τ, to the hysteresis process.

When the averaged steering torque obtained in step S11 is determined to be less than the threshold value L in step S12, then in step S13, the averaged steering torque obtained in step S11 is set as the steering torque τ* output value.

In the second embodiment, when the steering torque obtained by performing the two-value averaging filter process is less than the threshold value L, the averaged value is directly set as the output value steering torque τ*. The value obtained by the averaging filter process is used because the value obtained by performing the two-value averaging filter process suppresses (smoothens) fluctuation of the input value steering torque τ.

When the steering torque obtained by performing the two-value averaging filter process is greater than the threshold value L, the input value steering torque τ is subjected to hysteresis processing. This is because when the steering torque τ relative to the steering torque signal is large, the change in the current command value IA is large relative to minute fluctuations in the steering torque compared to when the steering torque τ is small, as shown in FIG. 7. The hysteresis process reduces such fluctuation. In this way, minute fluctuations caused by quantization errors and noise are eliminated.

In step S11 of FIG. 8, the averaging filter process may be performed using three or four values instead of two values so that the steering torque are followed more accurately. However, this would decrease the responsiveness relative to the steering torque.

Thus, the averaging process is performed to sufficiently suppress fluctuation of the output value, and the hysteresis process is performed when the output value is required to accurately follow the input value when high responsiveness is also required. Therefore, the hysteresis process is performed only when necessary, and calculation is performed efficiently.

The torque detector 50A and electric power steering controller 100A of the second embodiment have the following advantages in addition to those of the first embodiment.

(1) The torque detector 50A includes an averaging processor, which performs an averaging process on current data and past data of signals output from the A/D converter 18a, and a determiner, which determines the relationship of the data averaged by the averaging processor and a predetermined threshold value L. When the determiner determines that the averaged data (averaged steering torque) is greater than the threshold value L, a hysteresis processor performs the hysteresis process on the data (input value) input from the converter to generate and output data (output value) that is included in the hysteresis range based on the input data (input value).

Accordingly, fluctuation of the output value relative to the fluctuation of the input value is efficiently suppressed and the following accuracy and responsiveness of the output value when the input value suddenly changes are improved by performing the hysteresis process only when necessary.

(2) The electric power steering controller 100A includes the torque detector 50A and the motor controller for determining the motor torque corresponding to the steering torque to control the motor 6. When the determiner determines that the averaged data is greater than the threshold value, the motor controller obtains the motor torque by using the output value that is obtained subsequent to the hysteresis processing performed by the hysteresis processor device as the steering torque. Accordingly, the electric power steering controller 100A has the benefits of advantage (1).

(3) When the determiner determines that the averaged data is less than the threshold value L, the motor torque is determined by using the data averaged by the averaging filter as the steering torque. Accordingly, the hysteresis process is only performed when necessary, and calculation efficiency is improved.

It should be apparent to those skilled in the art that the present invention may be embodied in many other specific forms without departing from the spirit or scope of the invention. Particularly, it would be understood that the invention may be embodied in the following terms.

The torque detectors 50 and 50A may also be used in devices other than an electric power steering controller.

The filtering process for averaging the steering torque τ (input value) in step S11 of the second embodiment may also be executed using a plurality of past steering torques. In essence, at least one past steering torque may be used in the averaging filter process.

The hysteresis process also may be executed by hardware, for example, a Schmitt trigger circuit.

The converter 18a may be omitted.

Therefore, the present examples and embodiments are to be considered as illustrative and not restrictive and the invention is not to be limited to the details given herein, but may be modified within the scope and equivalence of the appended claims.

What is claimed is:

1. A torque detector for detecting torque that is produced when a steering shaft of a vehicle is rotated, the torque detector comprising:
   a detection element for detecting steering torque that is applied to the steering shaft when the steering shaft is rotated to generate an analog torque signal corresponding to the steering torque;
   a converter connected to the detection element to convert the analog torque signal to a digital torque signal; and
   a hysteresis processor connected to the converter to perform hysteresis processing on the digital torque signal so that a value of the digital torque signal is included in a predetermined range.

2. The torque detector according to claim 1, wherein:
   the hysteresis processor continuously receives the digital torque signal to perform hysteresis processing;
   when a change amount that is the difference between a value of the currently received digital torque signal and the value of the digital torque signal previously subjected to the hysteresis processing is included in the predetermined range, the hysteresis processor uses the value of the digital torque signal subjected to the previous hysteresis processing as the value of the digital torque signal subjected to the current hysteresis processing; and
   when the change amount is excluded from the predetermined range, the hysteresis processor adds the value of the digital torque signal subjected to the previous hysteresis processing to the difference between the change amount and the predetermined range, and sets that as the value of the digital torque signal of the current hysteresis processing.

3. A torque detector for detecting torque that is produced when a steering shaft of a vehicle is rotated, the torque detector comprising:
   a detection element for detecting steering torque that is applied to the steering shaft when the steering shaft is rotated to generate an analog torque signal corresponding to the steering torque;
   a converter connected to the detection element to convert the analog torque signal to a digital torque signal; and
   a calculation unit connected to the converter to continuously receive the digital torque signal from the converter and perform a predetermined calculation process on the digital torque signal, wherein the calculation unit includes:
      an averaging processor connected to the converter to perform averaging processing on at least one value of the digital torque signal received in the past and the value of the currently received digital torque signal;
      a determiner for determining the relationship between a predetermined threshold value and the value of the digital torque signal averaged by the averaging processor; and
      a hysteresis processor for performing hysteresis processing on the currently received digital torque signal to include the currently received digital torque signal in a predetermined range when the determiner determines that the value of the averaged digital torque signal is greater than the predetermined threshold value.

4. The torque detector according to claim 3, wherein:
   the hysteresis processor continuously receives the digital torque signal to perform hysteresis processing;
   when a change amount that is the difference between a value of the currently received digital torque signal and the value of the digital torque signal previously subjected to the hysteresis processing is included in the predetermined range, the hysteresis processor uses the value of the digital torque signal subjected to the previous hysteresis processing as the value of the digital torque signal subjected to the current hysteresis processing; and
   when the change amount is excluded from the predetermined range, the hysteresis processor adds the value of the digital torque signal subjected to the previous hysteresis processing to the difference between the change amount and the predetermined range and sets that as the value of the digital torque signal of the current hysteresis processing.

5. An electric power steering controller for assisting operation of a vehicle steering device, the steering device including a steering shaft connected to a steering wheel, the electric power steering controller comprising:
   a torque detector for detecting torque that is produced when the steering shaft is rotated, the torque detector including:
      a detection element for detecting steering torque that is applied to the steering shaft when the steering shaft is rotated to generate an analog torque signal corresponding to the steering torque;
      a converter connected to the detection element to convert the analog torque signal to a digital torque signal; and
      a hysteresis processor connected to the converter to perform hysteresis processing on the digital torque signal so that a value of the digital torque signal is included in a predetermined range;
   an electric motor connected to the torque detector to generate motor torque that is added to the steering force of the steering shaft; and
   a motor controller connected to the torque detector and the electric motor for obtaining the motor torque corresponding to a digital torque signal subjected to the hysteresis processing and controlling the motor.

6. The electric power steering controller according to claim 5, wherein:
   the hysteresis processor continuously receives the digital torque signal to perform hysteresis processing;
   when a change amount that is the difference between a value of the currently received digital torque signal and the value of the digital torque signal previously subjected to the hysteresis processing is included in the predetermined range, the hysteresis processor uses the value of the digital torque signal subjected to the previous hysteresis processing as the value of the digital torque signal subjected to the current hysteresis processing; and
   when the change amount is excluded from the predetermined range, the hysteresis processor adds the value of the digital torque signal subjected to the previous hysteresis processing to the difference between the change amount and the predetermined range and sets that as the value of the digital torque signal of the current hysteresis processing.

7. An electric power steering controller for assisting operation of a vehicle steering device, the steering device including a steering shaft connected to a steering wheel, the electric power steering controller comprising:
- a torque detector for detecting torque that is produced when the steering shaft is rotated, the torque detector including:
  - a detection element for detecting steering torque that is applied to the steering shaft when the steering shaft is rotated to generate an analog torque signal corresponding to the steering torque;
  - a converter connected to the detection element to convert the analog torque signal to a digital torque signal; and
  - a calculation unit connected to the converter to continuously receive the digital torque signal from the converter and perform a predetermined calculation process on the digital torque signal, wherein the calculation unit includes:
    - an averaging processor connected to the converter to perform averaging processing on at least one value of the digital torque signal received in the past and the value of the currently received digital torque signal;
    - a determiner for determining the relationship between a predetermined threshold value and the value of the digital torque signal averaged by the averaging processor; and
    - a hysteresis processor for performing hysteresis processing on the currently received digital torque signal to include the currently received digital torque signal in a predetermined range when the determiner determines that the value of the averaged digital torque signal is greater than the predetermined threshold value;
- an electric motor connected to the torque detector to generate motor torque that is added to the steering force of the steering shaft; and
- a motor controller connected to the torque detector and the electric motor for obtaining the motor torque of the electric motor, wherein the motor controller obtains the motor torque corresponding to the digital torque signal subjected to the hysteresis processing when the determiner determines that the averaged value of the digital torque signal is greater than the threshold value, and the motor controller obtains the motor torque corresponding to the averaged value of the digital torque signal when the determiner determines that the average value of the digital torque signal is less than or equal to the threshold value.

8. The electric power steering controller according to claim 7, wherein:
- when a change amount that is the difference between a value of the currently received digital torque signal and the value of the digital torque signal previously subjected to the hysteresis processing is included in the predetermined range, the hysteresis processor uses the value of the digital torque signal subjected to the previous hysteresis processing as the value of the digital torque signal subjected to the current hysteresis processing; and
- when the change amount is excluded from the predetermined range, the hysteresis processor adds the value of the digital torque signal subjected to the previous hysteresis processing to the difference between the change amount and the predetermined range and sets that as the value of the digital torque signal of the current hysteresis processing.

9. A torque detector for detecting torque that is produced when a shaft is rotated, the torque detector comprising:
- a detection element for detecting the torque that is applied to the shaft when the shaft is rotated to generate a torque signal corresponding to the torque; and
- a calculation unit connected to the detection element to perform hysteresis processing on the torque signal so that a value of the torque signal is included in a predetermined range.

10. The torque detector of claim 9, wherein:
- the calculation unit continuously receives the torque signal to perform the hysteresis processing;
- in the hysteresis processing, when a change amount that is the difference between a value of the currently received torque signal and the value of the torque signal previously subjected to the hysteresis processing is included in the predetermined range, the calculation unit uses the value of the torque signal subjected to the previous hysteresis processing as the value of the torque signal subjected to the current hysteresis processing; and
- in the hysteresis processing, when the change amount is excluded from the predetermined range, the calculation unit adds the value of the torque signal subjected to the previous hysteresis processing to the difference between the change amount and the predetermined range and sets that as the value of the torque signal of the current hysteresis processing.

11. The torque detector according to claim 9, wherein:
- the calculation unit continuously receives the torque signal to perform the hysteresis processing, the calculation unit including:
  - an averaging processor for performing averaging processing on at least one value of the torque signal received in the past and the value of the currently received torque signal; and
  - a determiner for determining the relationship between a predetermined threshold value and the value of the torque signal averaged by the averaging processor, wherein the calculation unit performs hysteresis processing on the currently received torque signal to include the currently received torque signal in a predetermined range when the determiner determines that the value of the averaged torque signal is greater than the predetermined threshold value.

12. The torque detector according to claim 11, wherein:
- in the hysteresis processing, when a change amount that is the difference between a value of the currently received torque signal and the value of the torque signal previously subjected to the hysteresis processing is included in the predetermined range, the calculation unit uses the value of the torque signal subjected to the previous hysteresis processing as the value of the torque signal subjected to the current hysteresis processing; and
- in the hysteresis processing, when the change amount is excluded from the predetermined range, the calculation unit adds the value of the torque signal subjected to the previous hysteresis processing to the difference between the change amount and the predetermined range and sets that as the value of the torque signal of the current hysteresis processing.

13. A method for detecting torque that is produced when a shaft is rotated, the method comprising:

detecting the torque applied to the shaft when the shaft is rotated;

generating a torque signal corresponding to the detected torque; and performing hysteresis processing on the torque signal to include the value of the torque signal in a predetermined range.

14. The method according to claim 13, wherein:

said generating a torque signal includes generating the torque signal a plural number of times;

said performing hysteresis processing includes:

performing hysteresis processing each time the torque signal is produced:

generating a change amount that is the difference between a value of the currently received torque signal and the value of the torque signal previously subjected to the hysteresis processing;

determining whether the change amount is included in the predetermined range;

when the change amount is included in the predetermined range, using the value of the torque signal subjected to the previous hysteresis processing as the value of the torque signal subjected to the current hysteresis processing; and when the change amount is excluded from the predetermined range, adding the value of the torque signal subjected to the previous hysteresis processing to the difference between the change amount and the predetermined range and setting that as the value of the torque signal of the previous hysteresis processing.

* * * * *